(12) United States Patent
Sillekens et al.

(10) Patent No.: US 7,992,419 B2
(45) Date of Patent: Aug. 9, 2011

(54) HIGH SPEED EXTRUSION

(75) Inventors: Wilhelmus Hubertina Sillekens, Herten (NL); Marco Hubertus Fransiscus Maria van Hout, Eindhoven (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 942 days.

(21) Appl. No.: 11/574,684

(22) PCT Filed: Sep. 6, 2004

(86) PCT No.: PCT/NL2005/000643
§ 371 (c)(1),
(2), (4) Date: Nov. 6, 2007

(87) PCT Pub. No.: WO2006/028367
PCT Pub. Date: Mar. 16, 2006

(65) Prior Publication Data
US 2008/0113058 A1 May 15, 2008

(30) Foreign Application Priority Data
Sep. 6, 2004 (EP) .................................. 04077477

(51) Int. Cl.
*B21C 23/00* (2006.01)
*B21C 3/00* (2006.01)

(52) U.S. Cl. ....................................... 72/253.1; 72/467

(58) Field of Classification Search .................. 72/253.1, 72/271, 467; 164/485, 443, 126, 128, 348; 264/497, 211.21; 425/378.1, 379.1
See application file for complete search history.

(56) References Cited

U.S. PATENT DOCUMENTS

| | | | | |
|---|---|---|---|---|
| 3,433,049 | A * | 3/1969 | Wessel et al. | 72/467 |
| 3,705,509 | A | 12/1972 | Haller | |
| 4,462,234 | A * | 7/1984 | Fiorentino et al. | 72/253.1 |
| 6,224,816 | B1 | 5/2001 | Hull et al. | |

FOREIGN PATENT DOCUMENTS

| | | |
|---|---|---|
| EP | 0 838 276 | 4/1998 |
| FR | 980781 | 5/1951 |
| JP | 3138018 | 6/1991 |
| JP | 3138019 | 6/1991 |
| JP | 8300035 | 11/1996 |
| WO | WO 91/12097 | 8/1991 |
| WO | WO 02/18071 | 3/2002 |

* cited by examiner

*Primary Examiner* — Teresa M Ekiert
(74) *Attorney, Agent, or Firm* — Swanson & Bratschun, L.L.C.

(57) ABSTRACT

An apparatus for extrusion, in particular for extrusion of metal, comprising an extrusion body defining a passage for material to be extruded, including a die having a bearing opening extending between a bearing opening entry surface and a bearing opening exit surface, and wherein cooling means are arranged in the body defining the extrusion passage upstream of the bearing opening exit surface, the cooling means comprising the material of the body being differentiated in thermal conductivity so as to define cooling pathways.

30 Claims, 3 Drawing Sheets

HIGH SPEED EXTRUSION

RELATED APPLICATIONS

This application is a 35 U.S.C. §371 national phase application of WO 2006/028367 PCT/NL2005/000643 (WO 2006/028367), filed on Sep. 6, 2005, entitled "High Speed Extrusion", which application claims priority to European Application Serial No. EP 04077477.0, filed Sep. 6, 2004, each of which is incorporated herein by reference in its entirety.

Extrusion is a manufacturing process in which sections or profiles having constant cross-section are produced by placing feed stock, a billet, in a container and forcing it through a die opening by a ram. The shape and dimensions of the die determine the cross-section of the product. For most metals, this batch or semi-continuous process is operated at elevated temperature to enhance the ductility of the material and/or to off-set mechanical loads.

Extrusion is a well-established means of manufacturing sections in a wide variety of shapes and dimensions. Extrusion facilities are being operated throughout the industrialized world. Extrusion is applied to ferrous (e.g. steel, stainless steel) as well as to non-ferrous (e.g. aluminium, copper, magnesium, titanium) metals and alloys. Aluminium is presently by far the prevailing material for processing. So-called square dies are usually used to produce solid sections. Single- and multi-hollow sections require more intricate tooling constructions known as spider dies, porthole dies and bridge dies. These dies enable the splitting and rejoining of the metal flow around the supports of an internal mandrel.

A principal limitation of the extrusion process for metals is the occurrence of hot cracking, also known as hot shortness. This surface defect is initiated by incipient melting of the material in the plastic zone due to excessive temperature rise, which, in combination with the mechanical stresses at the die bearing leads to cracks. This phenomenon is metal- and alloy specific, as it depends on such properties as flow stress and the incipient (i.e. non-equilibrium) melting temperature. Further, the higher the extrusion speed, the more adiabatic-like the process is, so in effect hot cracking fixes the speed for obtaining sound products to an upper level.

Since hot shortness is such a critical aspect in metal extrusion, considerable research and technological development effort has been dedicated to stretching this limit. With particular reference to the processing of aluminium and magnesium alloys, research has been done on: alloy compositions and billet preparation methods (e.g. casting, homogenization), alternative extrusion methods (e.g. indirect extrusion, hydrostatic extrusion) and adapted processing and tooling (e.g. closed-loop control systems for isothermal extrusion, cooling of dies).

FR 980 781 discloses an apparatus for extrusion having a body defining an extrusion passage and a die having a bearing opening with a cooling structure in a body defining the extrusion passage.

Regarding the cooling of dies for metal extrusion, JP 3138018 and JP 3138019 disclose an open system to cool extrusion dies by guiding a cooling medium through the die to the clearance cavity behind the die bearing.

WO 9112097 describes a construction for the cooling of metal extrusion dies. The construction is used to guide a cooling medium through the die through feed passages, splitting in circumferential direction in a distribution passage and letting it escape closely after the die bearing in the clearance cavity.

JP 3138018, JP 3138019 and WO 9112097 disclose square dies in which the latent heat for evaporation of a fluid is used for cooling in the clearance cavity behind the die bearing.

It is an object of the invention to improve the processing and tooling for the extrusion of metals. In particular, it is an object of the invention to improve the processing and tooling of metal extrusion such that the extrusion speed at which hot cracking is absent or at an acceptable level, can be increased.

By differentiating the material of the body in thermal conductivity so as to define cooling pathways, the relatively low thermal conductivity of the tooling material can be greatly increased.

Preferably, thermal conductivity is locally increased by providing a green porous structure from powder, e.g. through powder printing, sintering the structure. By filling the pores at some locations with conductive material, a cooling pathway can be formed. By filling the pores at other locations with strengthening material, a strengthening zone can be formed. By providing portions of open, porous structure, in fluidic communication with a cooling channel, porous cooling channels portions can be provided.

The porous body can be manufactured by so called rapid prototyping/rapid manufacturing techniques. Such techniques allow the apparatus to be provided with a tailored cooling system.

By providing the porous structure with areas of increased density, boundaries can be defined e.g. for the cooling pathways, the (porous) cooling channels or the strengthening zones.

The body is preferably at least partially built up as a porous structure. However, the body may also e.g. be provided with an insert to locally differentiate the material of the body in thermal conductivity.

Preferably, the porous structure is built as a green structure from particles, e.g. metal and/or ceramic particles. The green structure can subsequently be sintered to form a high-strength porous structure, e.g. one that can withstand filling the pores with the material having a higher thermal conductivity and/or the material having the higher strength. When the material having the higher thermal conductivity is e.g. copper, it is infused into the pores through capillary action. Likewise, the strengthen material may be molten steel.

The porous structure may subsequently be used as an insert when using a conventional die manufacturing technique, e.g. through sintering.

However, the apparatus may also be formed using a rapid prototyping/rapid manufacturing technique. Preferably, the porous structure is then built up in layers through layer based manufacturing, preferably using sliced CAD computer files. Suitable rapid manufacturing techniques are e.g. direct metal laser sintering made available by the company EOS, direct metal laser melting as made available by the company Trumpf, and powder printing with infiltration as made available by the company Pro-metal.

By passing the surface of the material that is processed along a cooling zone before leaving the bearing opening peak temperature at critical locations can be topped of so that the surface of the material to be processed can be prevented from reaching the incipient melting temperature. This way, extrusion can take place at higher speed, while it is still possible to obtain sound products. Further, due to the reduction of peak temperature in mechanically loaded areas, the life of the die may be prolonged. In addition, due to reduction of die deflection, the accuracy of the product can be improved.

By cooling the surface area at critical places before the surface has left the bearing opening, the formation of cracks at local surface areas weakened by melting can be prevented.

By cooling at least a part of the surface of the bearing opening of the die, the cooling can be applied at the most critical areas.

By cooling at least a part of the surface of an entrance zone of the bearing opening, more area can be made available for cooling, and more time can be made available for heat extraction from the moving material to be processed.

In a preferred embodiment, the surface of the material to be processed is passed along an entrance zone that converges in the direction of the flow, so that relatively large area can be made available for cooling. In addition, the redundant work in the material to be processed can be simultaneously reduced, thereby reducing the rise in temperature of the material to be processed. Preferably, the entrance zone of the die is conical.

Further advantageous embodiments of the invention are discussed below and are defined in the appended claims.

The invention shall be elucidated using a preferred embodiment shown in a drawing. In the drawing:

FIG. 3b shows a detail of the porous structure of the die of FIG. 3a.

In the figures, corresponding parts have been denoted using the same reference numerals. The figures only shows schematical representations of exemplary embodiments, which are given as non-limiting examples of the invention.

Figure 1:
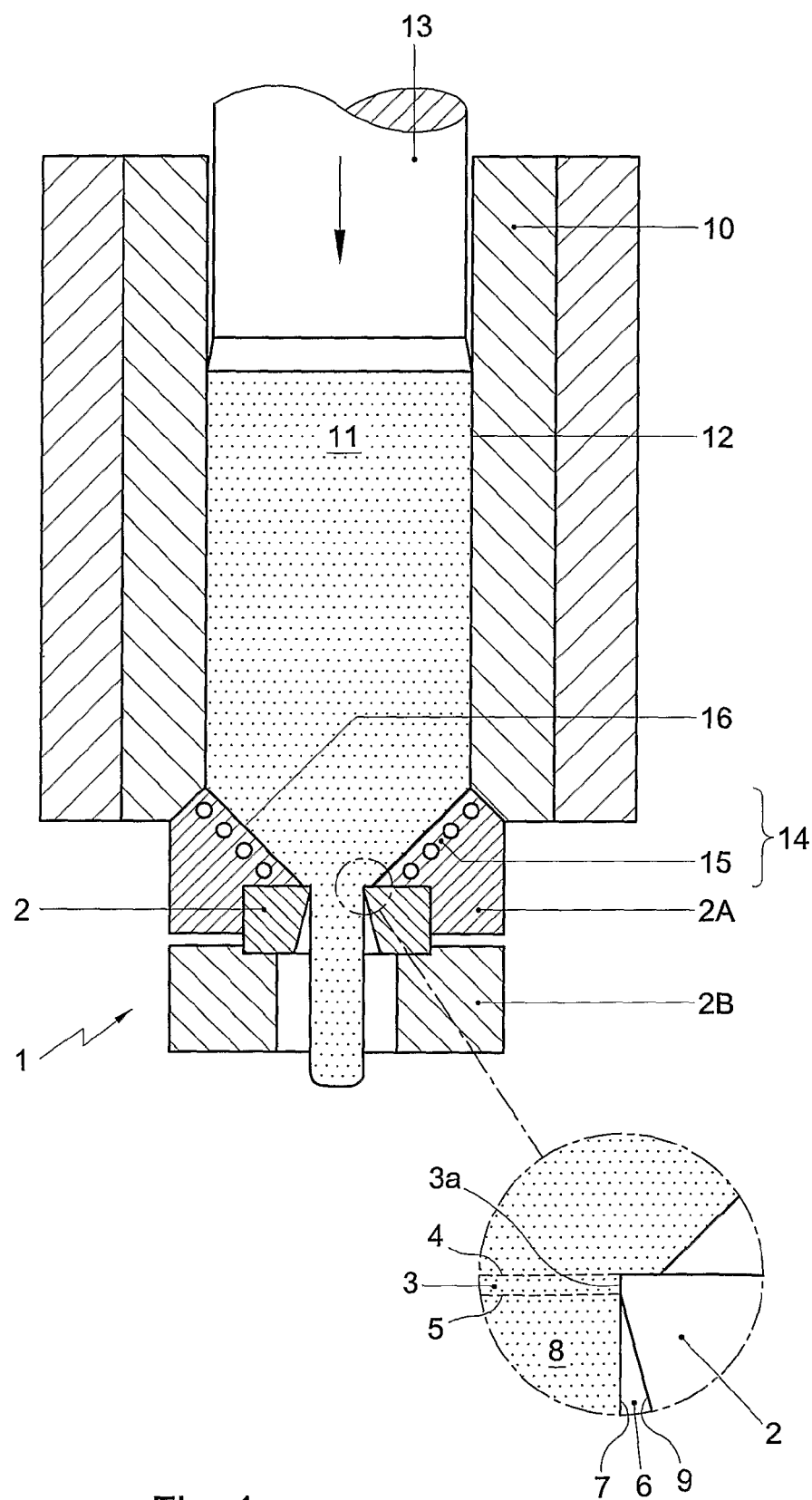
FIG. 1 shows a schematic cross-section of an apparatus for extrusion according to the invention.

FIG. 1 shows an apparatus 1 for extrusion of metal. The apparatus comprises a die 2 having a bearing opening 3 through which metal to be processed is forced, so that it is formed into a profile having a constant cross-section.

The bearing opening 3 comprises a bearing opening surface 3a that extends between a bearing opening entry plane 4 of the die and a bearing opening exit plane 5. The exit plane forms an opening of the die 3 that is in downstream direction adjacent to a clearance cavity 6 formed between the outer surface 7 of the profile 8 and a clearance surface 9 of the die.

The apparatus 1 further comprises a container 10 that is closed off by the die 2. The container 10 holds a billet 11 of metal to be processed in a chamber 12. The apparatus 1 further comprises a ram 13 that can be pushed into the chamber 12 to force the material of the billet 11 through the bearing opening 3 of the die 2, thereby forming the profile 8. The extrusion process may also be arranged differently, e.g. in a hydrostatic variant wherein the chamber is filled with a liquid onto which the ram 13 acts to indirectly force the billet 11 through the bearing opening 3 of the die 2.

The apparatus is provided with cooling means 14 that are located stream upward of the exit surface 5 of the bearing opening 3.

In this arrangement, the cooling means comprises cooling channels 15 of a cooling circuit that extends along an entrance zone 16 of the die 2. In this embodiment, the die 2 is of modular construction having an entrance ring 2A placed between the container 10 and the product-specific part of the die comprising the bearing opening. The entrance ring defines an entrance zone that converges conically in the direction of the entrance surface 4 of the bearing opening 3. Together with a die holder 2B, the entrance ring holds the product-specific part of the die 2 that is provided with the bearing opening. It shall be clear that the cooling means can be arranged to extend along at least a part of the surface of the bearing opening and/or at least a part of the surface of the entrance zone.

In this embodiment, the cooling zone is thus placed at least partially outside of the container.

The conical shape of the die entrance opening reduces the amount of heat generated within the critical areas of the billet.

Further, by cooling stream upward of the exit plane of the bearing opening 3, heat can be conducted from the critical areas of the billet 11. In this embodiment, this is done by passing or circulating a cooling medium through channels 15 in the die 2. This can be regarded as a means of increasing the heat capacity of the die 2. The conical shape of the die entrance zone 16 ensures a large contact area and allows for sufficient interaction time between the cooled surface area and the material that is processed. This way, heat generation is limited, while simultaneously stimulating heat diffusion.

Figure 2:
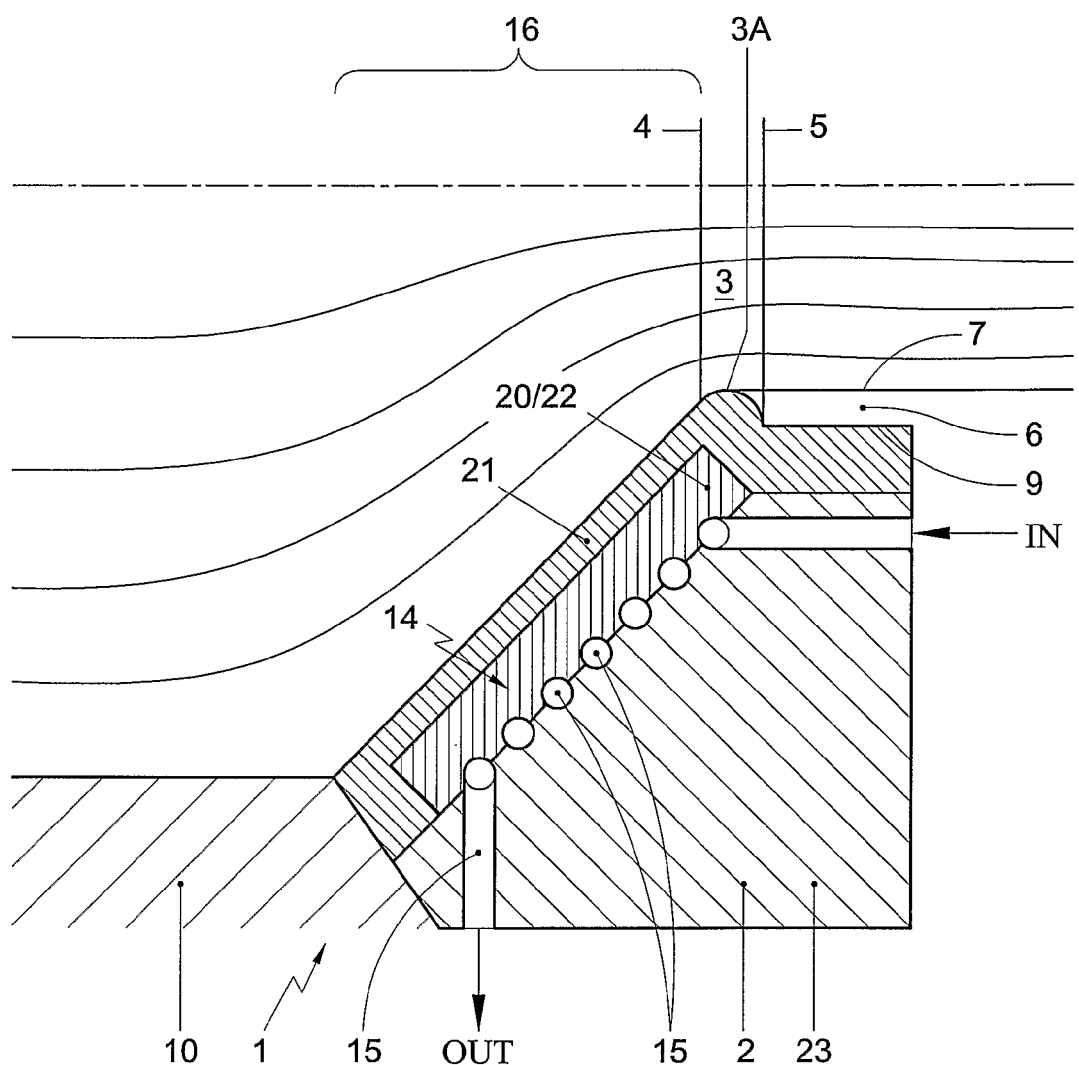
FIG. 2 shows a schematic cross section of a first embodiment of a die body that is differentiated in thermal conductivity according to the invention.

FIG. 2 shows a schematic cross section of an embodiment of an apparatus according the invention in which the body is formed by the die 2.

The material of the body of the die 2 is differentiated in thermal conductivity so that a cooling pathway 20 is defined. The die 2 is built up of a high strength die part 21 of e.g. high strength steel. The body of the die 2 further comprises an insert 22 of highly conductive material, e.g. copper.

The body of the die 2 also comprises a supporting die part 23 in which cooling channels 15 have been arranged.

Figure 3A:
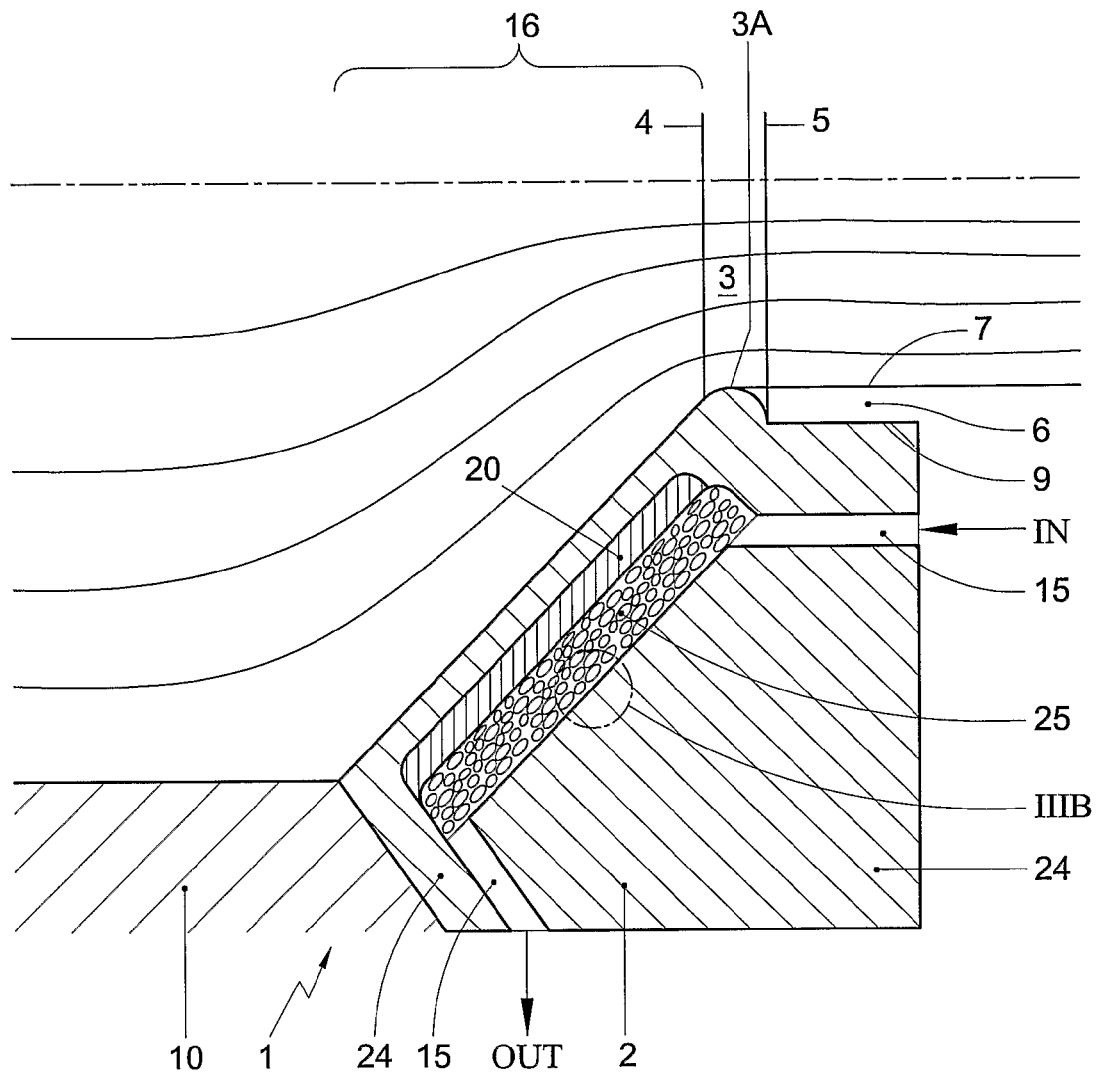
FIG. 3a shows a schematic cross section of a second embodiment of a die according to the invention.

FIG. 3 shows a schematic cross section of a second embodiment of a die according to the invention. The die 2 has been manufactured by rapid prototyping and has been provided with a tailored cooling system.

The body of the die 2 has been built up from powdered steel particles using layer based manufacturing.

During manufacturing of the green structure, areas of increased density have been provided that define boundaries for cooling pathways, cooling channels and high-strength areas.

After sintering, a cooling pathway 20 has been formed by filling the pores of the material between the boundaries with copper.

Strengthening zones 24 (shown in hatching) have been formed by filling the pores with steel. Also, cooling channels 15 for flowing a cooling liquid there through have been defined as void areas between boundaries of increased density.

Figure 3B:
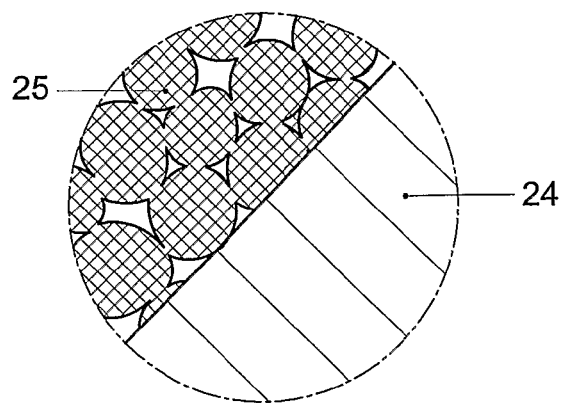

The porous structures that have been left open as shown in FIG. 3b, so that cooling liquid may flow through a porous zone 25 in the structure.

It shall be clear that the invention is not limited to the embodiment described above. For instance, the invention cannot only be applied to solid sections as shown, but also to more complicated shaped sections such as (multi)-hollow sections.

Preferably, the cooled die parts are thermally isolated from the heated container.

As discussed, the die construction can be modular, with components like a general purpose shaped cooled entrance ring, an exchangeable product-specific die, and a separate die casing for mechanical support.

The die can e.g. be manufactured by traditional means, or by using rapid manufacturing techniques based on for instance layer deposition. The latter option has the advantage of providing the die with a tailored cooling system, e.g. a conformal cooling system, and/or a distribution of the cooling channels that is adapted to the critical areas of the bearing opening and/or the geometrical features of the bearing opening.

Further, the die entrance can be of another shape that provides for a large contact surface area for heat exchange.

Parts of the die, in particular the die entrance, can be provided with a coating. Such intermediary layer between billet and die material should be able to withstand a thermal and mechanical load and give favourable tribological and/or interfacing conditions.

The cooling circuit can be laid out either to cool equally across the circumference of the die or in a tailored fashion. The latter will enable to locally relieve critical locations ("hot spots") and/or may reduce residual stresses in and distortions (warping, twisting) of the produced sections.

The cooling circuit can be close or open, meaning that the cooling medium can either be circulating (involving its transport to and from the die) or escaping to the surroundings after having served. Both options may use latent heat for evaporation of the cooling medium as an additional cooling mechanism.

The cooling circuit can be provided with a control device. By doing so, the cooling action during the extrusion process and/or between subsequent extrusions can be adapted so as to level flash temperature over the duration of the extrusion and/or within production runs.

The cooling circuit can be used to cool, but also to preheat the die. This may be beneficial during the start up of a production, and during down-time and/or to avoid chill of the billet.

Those variations will be clear to the skilled man and are within the scope of the invention as the defined in the appended claims.

The invention claimed is:

1. An apparatus for extrusion, in particular for extrusion of metal, comprising:
   an extrusion body defining an extrusion passage for material to be extruded, including a die having a bearing opening extending between a bearing opening entry surface and a bearing opening exit surface; and
   cooling means in the body defining the extrusion passage upstream of the bearing opening exit surface, the cooling means comprising the material of the body being differentiated in thermal conductivity so as to define cooling pathways, wherein the body comprises a porous structure comprising a plurality of pores, further comprising fluid pathways formed by open portions of the porous structure of the body that are in fluidic communication with a cooling channel.

2. The apparatus of claim 1, further comprising the cooling pathways comprising zones of increased thermal conductivity which have been formed by filling at least a portion of the pores of the porous structure with material having a higher thermal conductivity than a material defining the porous structure.

3. The apparatus of claim 2, wherein the material of increased thermal conductivity comprises copper.

4. The apparatus of claim 2, further comprising at least a portion of the pores of the porous structure being filled with material having a higher strength than the material defining the porous structure to form zones of increased strength.

5. The apparatus of claim 1, wherein the cooling means further comprises cooling channels arranged for the flow of a cooling medium there through.

6. The apparatus of claim 1, further comprising at least a portion of the pores of the porous structure being filled with material having a higher strength than the material defining the porous structure to form zones of increased strength.

7. The apparatus of claim 1, wherein the porous structure comprises sintered particles.

8. The apparatus claim 1, wherein the porous structure comprises areas of increased density that define boundaries for the fluid pathways.

9. The apparatus of claim 1, wherein the porous structure is built up of layers.

10. The apparatus of claim 1, wherein the porous structure comprises steel.

11. The apparatus of claim 1, wherein the cooling means are arranged to cool at least a part of the surface of the bearing opening of the die.

12. The apparatus of claim 1, wherein the cooling means is operatively associated with at least a part of a surface of the bearing opening.

13. The apparatus of claim 1, further comprising the extrusion body defining an entrance zone that converges towards the bearing opening.

14. The apparatus of claim 1, wherein the entrance zone is conical.

15. The apparatus of claim 1, wherein the die is integrally formed with the extrusion body.

16. An apparatus for extrusion, in particular for extrusion of metal, comprising:
    an extrusion body defining an extrusion passage for material to be extruded, including a die having a bearing opening extending between a bearing opening entry surface and a bearing opening exit surface; and
    cooling means arranged in the body defining the extrusion passage upstream of the bearing opening exit surface, the cooling means being configured to provide tailored cooling about an inner surface of at least one of the extrusion passage and the die, wherein the body comprises a porous structure comprising a plurality of pores, further comprising fluid pathways formed by open portions of the porous structure of the body that are in fluidic communication with a cooling channel.

17. The apparatus of claim 16, further comprising the cooling means comprising cooling pathways comprising zones of increased thermal conductivity which have been formed by filling at least a portion of the pores of the porous structure with a material having a higher thermal conductivity than a material defining the porous structure.

18. The apparatus of claim 17 further comprising the cooling means comprising the fluid pathways being formed by at least a portion of the pores of the porous structure remaining open to provide for the flow of a cooling medium there through.

19. The apparatus of claim 17, further comprising at least a portion of the pores of the porous structure being filled with material having a higher strength than the material defining the porous structure to form zones of increased strength.

20. The apparatus of claim 16, wherein the porous structure comprises sintered particles.

21. The apparatus of claim 16, wherein the die is manufactured by rapid prototyping.

22. A method for manufacturing an apparatus for extrusion comprising:
    forming an extrusion body that defines a material passage for material to be extruded;
    forming a die communicating with the material passage, the die comprising a bearing opening extending between a bearing opening entry surface and a bearing opening exit surface; and
    forming cooling means operatively associated with the extrusion body material passage upstream of the bearing opening exit surface by differentiating the material of the extrusion body in thermal conductivity so as to define cooling pathways, wherein the body comprises a porous structure comprising a plurality of pores, further comprising forming the cooling channels in the extrusion body operatively associated with the cooling pathways for the flow of a cooling medium there through.

23. The method of claim 22, further comprising forming the cooling pathways by filling at least a portion of the pores with material having a higher thermal conductivity than the material of the porous structure.

24. The method of claim 22, further comprising forming zones of increased strength in the extrusion body by filling at least a portion of the pores with material having a higher strength than the material of the porous structure.

25. The method of claim 22, further comprising forming the porous structure as a green structure from particles.

26. The method of claim 25, wherein the particles comprise at least one of metal and ceramics.

27. The method of claim 25, further comprising sintering the green structure.

28. The method of claim 25, further comprising building up the green structure in layers.

29. The method of claim 25, further comprising manufacturing the green structure using a rapid prototyping/rapid manufacturing technique.

30. The method of claim 22, further comprising forming the die integrally with the extrusion body.

* * * * *